(12) United States Patent
Pettinotto et al.

(10) Patent No.: US 11,029,012 B2
(45) Date of Patent: Jun. 8, 2021

(54) CONNECTION DEVICE FOR A LUMINAIRE

(71) Applicant: SCHNEIDER ELECTRIC INDUSTRIES SAS, Rueil-Malmaison (FR)

(72) Inventors: Gilles Pettinotto, Vaulnaveys le Haut (FR); Michel Dalbe, Claix (FR); Michael Jonsson, Linkoeping (SE)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 0 days.

(21) Appl. No.: 16/701,273

(22) Filed: Dec. 3, 2019

(65) Prior Publication Data
US 2020/0191372 A1    Jun. 18, 2020

(30) Foreign Application Priority Data

Dec. 18, 2018 (FR) ...................................... 1873226

(51) Int. Cl.
| | |
|---|---|
| *H01R 3/00* | (2006.01) |
| *F21V 23/06* | (2006.01) |
| *H05B 47/19* | (2020.01) |
| *F21S 8/02* | (2006.01) |
| *F21V 23/00* | (2015.01) |

(52) U.S. Cl.
CPC .............. *F21V 23/06* (2013.01); *F21S 8/024* (2013.01); *F21V 23/006* (2013.01); *H05B 47/19* (2020.01)

(58) Field of Classification Search
CPC ...... F21V 23/06; F21V 23/006; F21V 23/045; F21V 23/0435; F21V 21/03; F21V 21/002; H05B 47/19; F21S 8/024; H02G 3/20
See application file for complete search history.

(56) References Cited

U.S. PATENT DOCUMENTS

| | | | | |
|---|---|---|---|---|
| 7,888,597 | B2* | 2/2011 | Libby, II | H02G 3/20 |
| | | | | 174/58 |
| 8,398,435 | B2* | 3/2013 | Aurongzeb | H01R 13/625 |
| | | | | 439/607.41 |
| 9,970,634 | B1* | 5/2018 | Wronski | F21V 23/026 |

(Continued)

FOREIGN PATENT DOCUMENTS

GB    2559891 A    8/2018

OTHER PUBLICATIONS

French Preliminary Search Report dated Oct. 14, 2019 in French Application 1873226 filed on Dec. 18, 2018 (with English Translation of Categories of Cited Documents).

*Primary Examiner* — Abdullah A Riyami
*Assistant Examiner* — Nelson R. Burgos-Guntin
(74) *Attorney, Agent, or Firm* — Oblon, McClelland, Maier & Neustadt, L.L.P.

(57) ABSTRACT

A connection device for a luminaire includes a housing that is intended for installation in a mounting space in a wall of a premises, this device including a connection socket for a luminaire and a connection zone for connection to an electrical network. The housing forms an interior volume inside which members for supplying the luminaire with electrical power, members for connection between the connection socket for the luminaire and the connection zone for connection to the electrical network and a system for control and communication with a unit external to the connection device are incorporated.

6 Claims, 11 Drawing Sheets

(56) References Cited

U.S. PATENT DOCUMENTS

| | | | |
|---|---|---|---|
| 2013/0083529 A1 | 4/2013 | Gifford | |
| 2013/0130522 A1* | 5/2013 | Mitchell | H01R 13/625 |
| | | | 439/133 |
| 2013/0210252 A1* | 8/2013 | Ilyes | H01R 24/38 |
| | | | 439/226 |
| 2014/0301087 A1* | 10/2014 | Wronski | H02G 3/20 |
| | | | 362/368 |
| 2015/0087174 A1* | 3/2015 | Schmitt | H01R 33/9456 |
| | | | 439/232 |
| 2015/0338077 A1 | 11/2015 | Johnson | |
| 2015/0345761 A1* | 12/2015 | Lawlor | F21V 21/14 |
| | | | 362/364 |
| 2016/0072176 A1* | 3/2016 | Van Dijk | H01Q 1/02 |
| | | | 343/721 |
| 2016/0127643 A1* | 5/2016 | Huerta | H01F 38/14 |
| | | | 348/211.2 |
| 2016/0215967 A1* | 7/2016 | Chad | F21V 29/673 |
| 2017/0214229 A1 | 7/2017 | Smith et al. | |
| 2017/0307198 A1* | 10/2017 | Shah | F21V 5/04 |
| 2018/0017243 A1* | 1/2018 | Palmer | F21V 29/673 |
| 2018/0115131 A1 | 4/2018 | Kohen | |
| 2018/0320847 A1* | 11/2018 | Moghal | F21V 29/77 |
| 2019/0027099 A1* | 1/2019 | Kumar | H05B 45/10 |
| 2019/0041026 A1* | 2/2019 | Stolte | F21V 23/045 |
| 2019/0049080 A1* | 2/2019 | Danesh | F21S 8/02 |
| 2019/0104585 A1* | 4/2019 | Albrechtsen | F21V 23/008 |
| 2019/0318697 A1* | 10/2019 | Kumar | H05B 45/24 |
| 2019/0323691 A1* | 10/2019 | Winters | F21V 5/04 |
| 2020/0116340 A1* | 4/2020 | Nikooyan | F21V 29/76 |
| 2020/0191372 A1* | 6/2020 | Pettinotto | F21V 21/03 |
| 2020/0292138 A1* | 9/2020 | Crayford | F21K 9/235 |

\* cited by examiner

CONNECTION DEVICE FOR A LUMINAIRE

The present invention relates to a connection device for a luminaire.

Current building standards dictate the installation, in the walls of domestic or tertiary premises, of devices for connection of luminaires (DCLs) that include sockets for the connection of luminaires which do not require users to handle electrical wires. These DCLs are mounted within recessed housings which are themselves mounted within walls or ceilings and have predefined dimensions. DCLs also have dimensions predefined by the housing within which they are installed, and have a central shaft for the insertion of a screw for the attachment of the luminaire. DCLs are formed by a housing enclosing electronic components and connection members.

The need for smart devices, in particular devices that can be controlled remotely by smartphone, means that DCLs must be connected to external communication devices, in particular by remote control using radiofrequency techniques (Bluetooth, etc.).

Currently, luminaires may be remotely controlled via smart bulbs or fittings, i.e. those fitted with control buttons and communication systems. These communication devices are also mounted within the free space inside the recessed housing. It usually takes an electrician several minutes to carry out the wiring needed for each luminaire, which involves substantial extra cost.

It is these drawbacks that the invention intends to overcome by providing a new connection device for a luminaire in which mounting and the incorporation of smart functions are much more straightforward.

To this end, the invention relates to a connection device for a luminaire comprising a housing that is intended for installation in a mounting space in a wall of a premises, this device comprising a connection socket for a luminaire and a connection zone for connection to an electrical network. This device is characterized in that the housing forms an interior volume inside which members for supplying the luminaire with electrical power, members for connection between the connection socket for the luminaire and the connection zone for connection to the electrical network and a system for control and communication with a unit external to the connection device are incorporated.

By virtue of the invention, the DCL housing already encloses all of the components needed for remote control. Ease of mounting is greatly increased, since it is no longer necessary to involve an electrician in connecting the communication systems.

According to some advantageous but non-mandatory aspects of the invention, such a connection device for a luminaire may incorporate one or more of the following features, in any technically permissible combination:

The system for control and communication comprises a radiofrequency communication antenna, the device includes a front face that is rigidly connected to the housing and configured to protrude out of the mounting space, and the antenna is installed in a zone of the device that is located in a volume delimited by the front face.

The front face has a wall provided with a decrease in thickness forming a cavity oriented towards an inner side of the housing and in which the communication antenna is accommodated.

The members for supplying the luminaire with electrical power are provided on a first circuit board that is mounted within the housing, the members for connection between the connection socket for the luminaire and the connection zone for connection to the electrical network are provided on a second circuit board that is mounted within the housing, and the system for control and communication is provided on a third circuit board that is mounted within the housing.

The first circuit board is oriented parallel to a centre axis of the housing, the second and third boards are oriented perpendicular to the centre axis, the second board being attached to a first axial edge of the first board, and the third board being attached to a second axial edge of the first board opposite the first axial edge along the centre axis.

The circuit boards are attached by means of slot-fitting members and welds ensuring that the boards are electrically connected to one another.

The second and third circuit boards have a semicircular outline centred on the centre axis and delimited by an inner wall of the housing, and a central aperture around a central shaft of the housing.

The invention will be better understood and other advantages thereof will become more clearly apparent in the light of the following description of a connection device for a luminaire according to the principle thereof, provided by way of non-limiting example and with reference to the appended drawings, in which.

Figure 1:
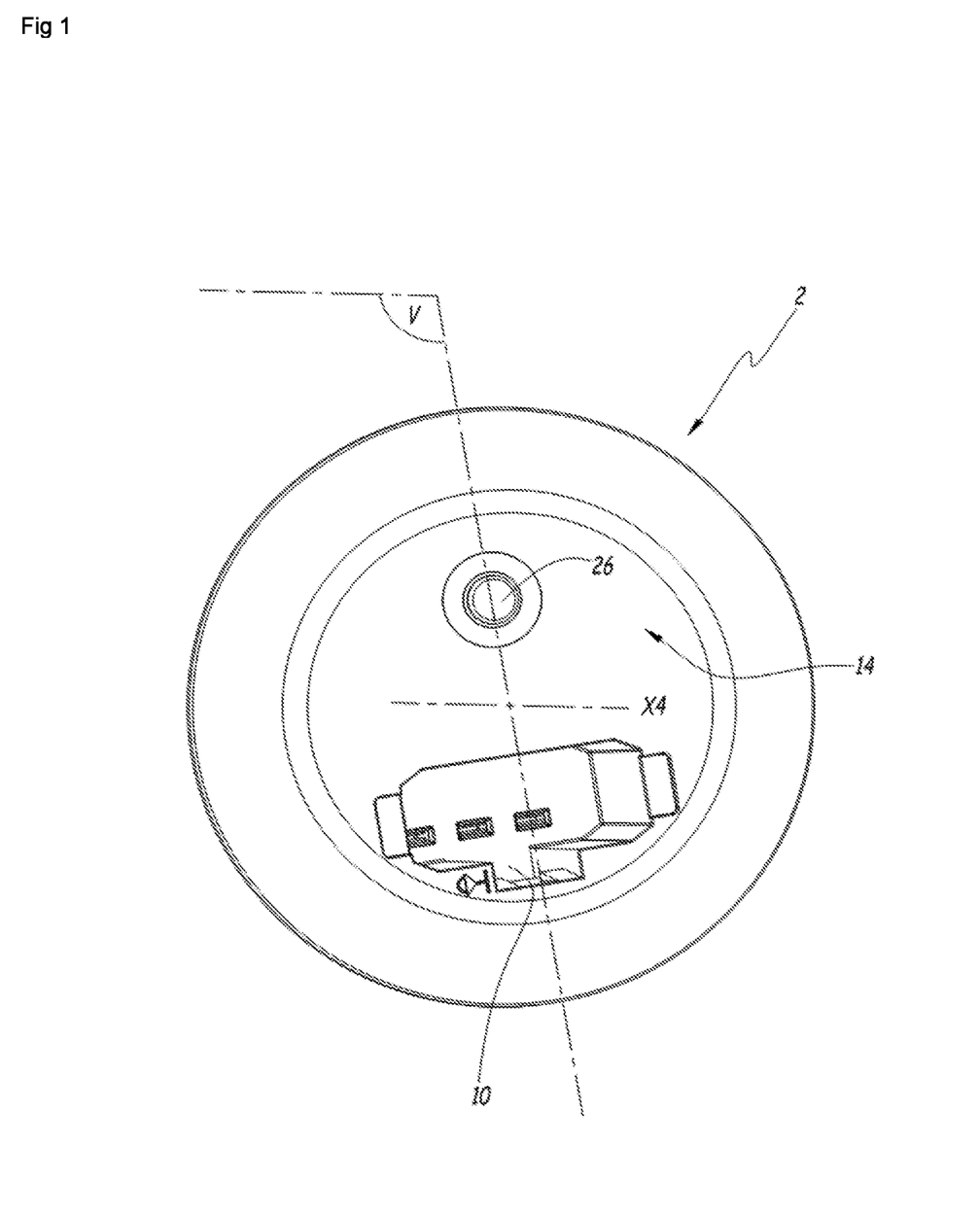
FIG. 1 is a perspective view from a front face of a connection device for a luminaire according to the invention.
Figure 2:
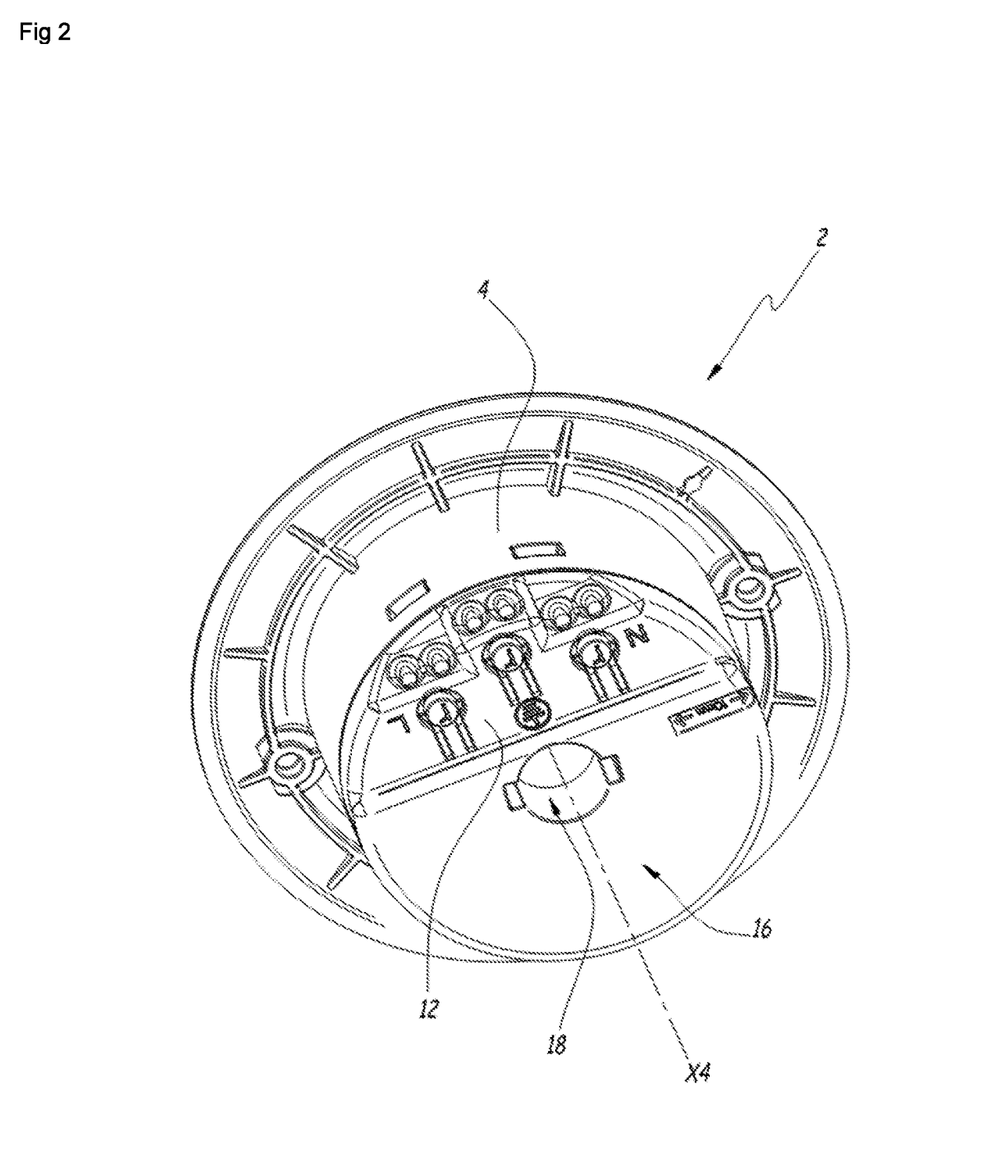
FIG. 2 is a perspective view from a back face of the connection device of FIG. 1.
Figure 5:
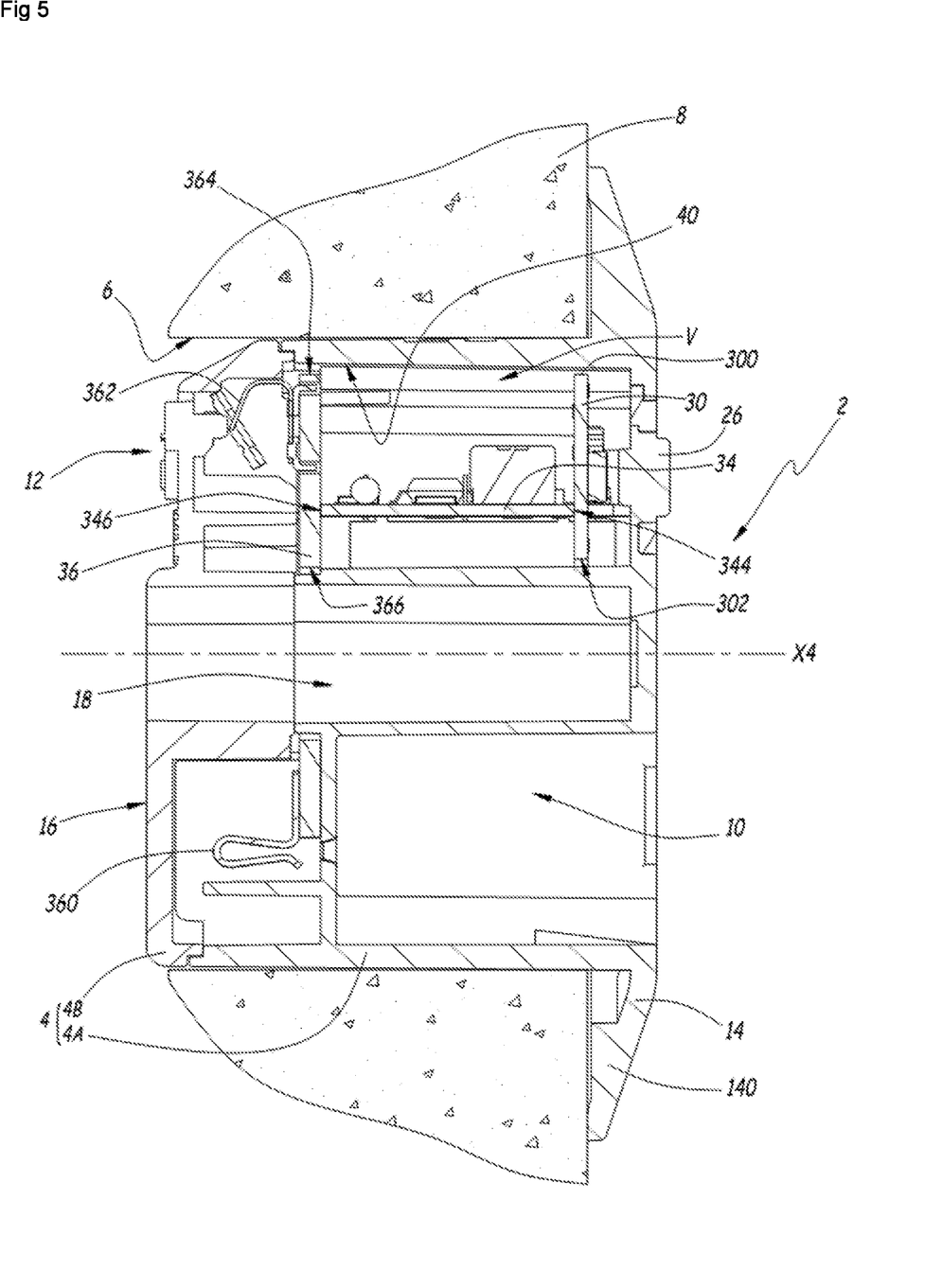
FIG. 5 is a section along the plane V of the connection device of FIG. 1.
Figure 11:
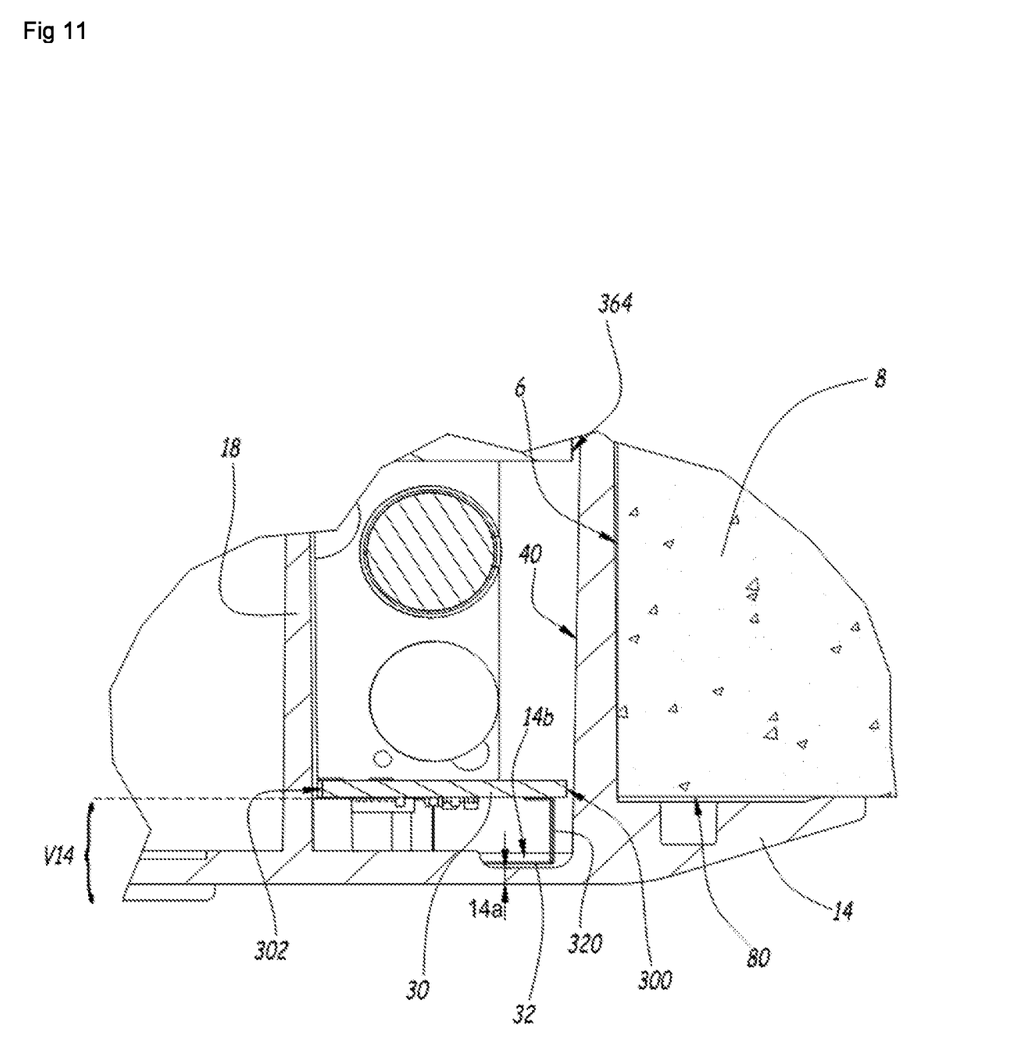
FIG. 11 is a cross section of the connection device set in a wall and through the antenna of FIG. 10.

FIG. 1 shows a connection device 2 for a luminaire (not shown), comprising a housing 4 that is intended to be installed within a mounting space 6, which can be seen in FIGS. 5 and 11, provided in a wall 8 of a room in a premises (not shown). This connection device 2, commonly referred to as a "DCL" for "device for connection of luminaires", comprises a standardized connection socket 10 for the luminaire and a connection zone 12 for connection to an electrical network. The aim of this device is to facilitate the installation of luminaires for the occupant of the premises.

The connection socket 10 is located on a front face 14 of the housing 4, which protrudes out of the wall 8, and which comprises a rim 140 which extends out and against the wall 8. The connection zone 12 is located on the back face 16 of the housing 4 and located within the mounting space 6.

The housing 4 takes the shape of a cylinder of circular cross section which is centred on a centre axis X4. The centre axis X4 is perpendicular to the wall 8 within which the mounting space 6 is provided. In the case shown in FIG. 5, the wall 8 is vertical, the device 2 being mounted in a building wall. As a variant, the wall 8 may be horizontal, the device 2 being mounted in a ceiling.

The housing 4 comprises a central shaft 18 that is centred on the centre axis X4 and that runs the entire length of the housing 4 along the centre axis X4. This central shaft 18 is intended to receive, by screwing, a rod ending in a hook for hanging a luminaire.

Figure 3:
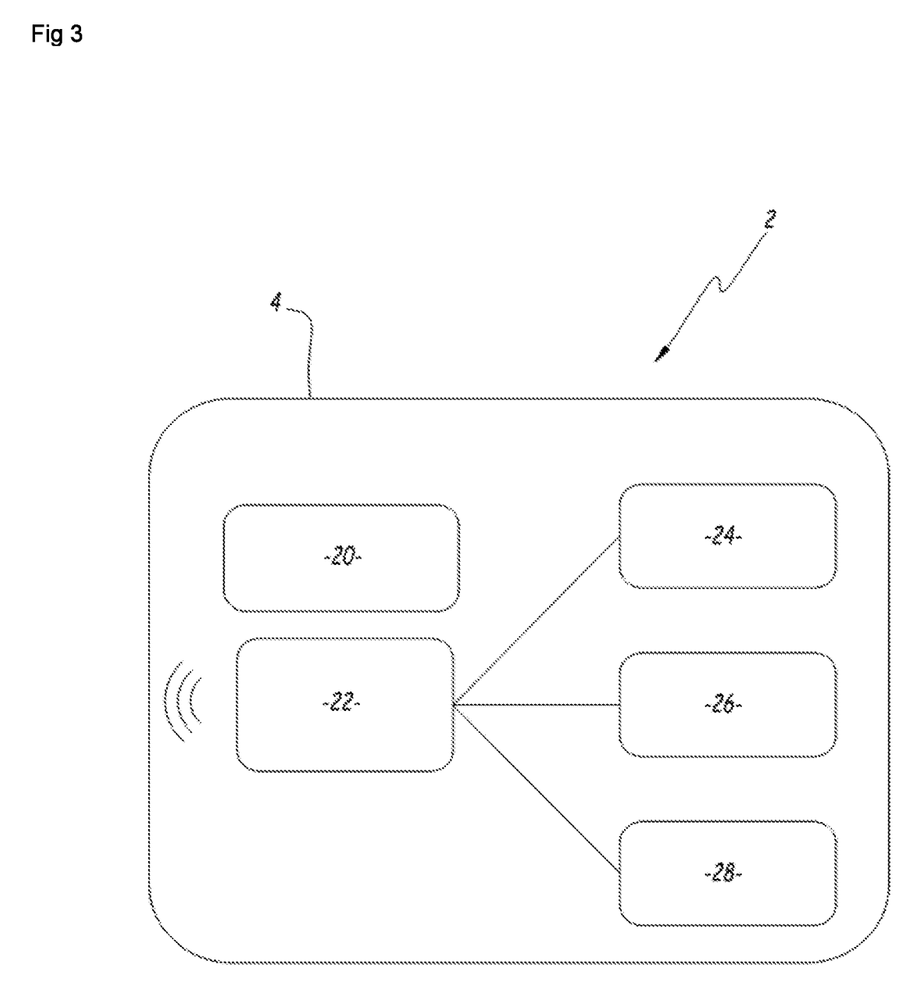
FIG. 3 is a diagram of the components and integrated functions in the connection device of FIG. 1.

The housing 4 forms an interior volume V inside which members for supplying the luminaire with electrical power, members for connection between the connection socket 10 for the luminaire and the connection zone 12 for connection to the electrical network and a system for control and communication with a unit external to the connection device 2 are incorporated. Thus, the device 2 consolidates, within the same housing 4, electrical power supply regulating and adjusting functions 20, a microprocessor 22 implementing operating software (firmware) and a communication module, colour diodes 24 that signal operating states of the device, a control button 26 for controlling the device 2 and for implementing certain functions, in particular pairing with an external electronic device, and a relay 28, 342 for powering the luminaire. The connection device 2 is supplied with electric current from the mains via the connection zone 12. The diodes 24, the button 26 and the relay 28, 342 are electrically connected to the microprocessor 22.

The consolidation of all of the functions within one and the same housing greatly facilitates installation: the facilities technician in a building under construction simply connects the electrical wires present in the mounting space 6 to the corresponding terminals of the connection zone 12. There is no need for particular knowledge to connect the system for control and communication to the other components, unlike the current methods implementing separate communication systems and DCLs.

Figure 6:
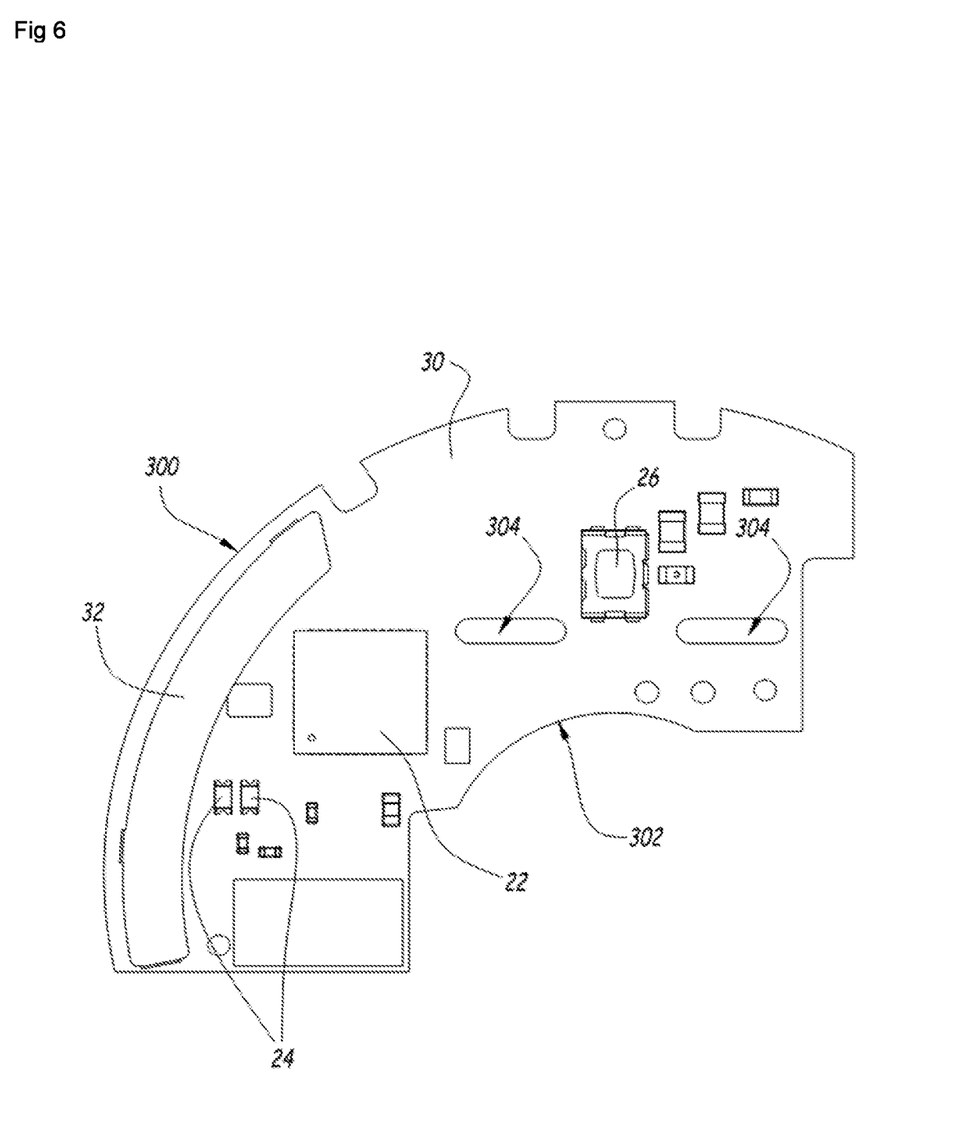
FIG. 6 is a view from above of a circuit board for control and communication of the connection device.

The system for control and communication is provided on a circuit board 30 that can be seen in FIG. 6 and is mounted within the housing 4. This board 30 comprises in particular the microprocessor 22, two diodes 24 and the pushbutton 26.

Figure 10:
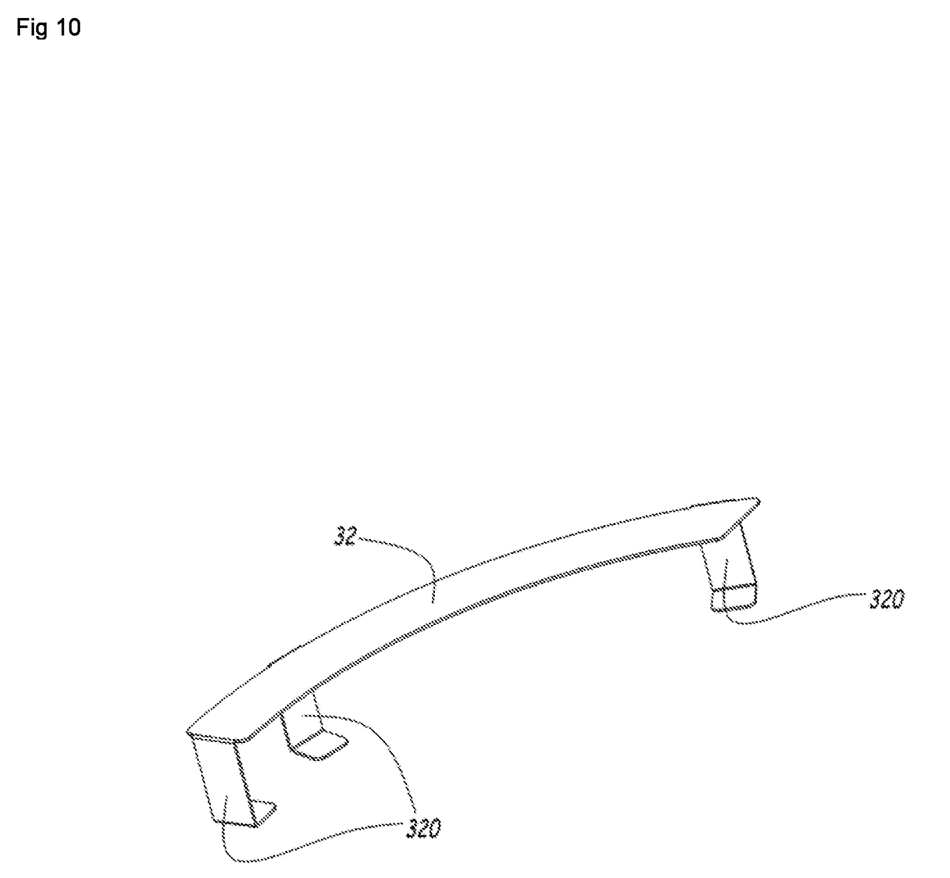
FIG. 10 is a perspective view of an antenna of the board for control and communication of FIG. 6.

The system for control and communication comprises a radiofrequency communication antenna 32 that is connected to the board 30. To allow the transmission and reception of waves, for example Bluetooth or Zigbee waves, the antenna 32 must be located outside the volume of the mounting space 6 so that the material of the wall 8, for example concrete, does not hinder the propagation of the waves. The front face 14, which is rigidly connected to the housing 4, is therefore configured to protrude out of the mounting space 6, and the antenna 32 is installed in a zone of the device 2 that is located in a volume V14 delimited by the front face 14. The antenna 32 is located beyond an outer face 80 of the wall 8.

The antenna 32 includes feet 320 that are attached to the board 30, and that allow the antenna 32 to be raised in relation to the board 30.

The front face 14 has a wall provided with a decrease in thickness 14a forming a cavity 14b oriented towards an inner side of the housing 4 and in which the communication antenna 32 is accommodated. This decrease in thickness allows improves reception and transmission of waves by the antenna 32.

Figure 7:
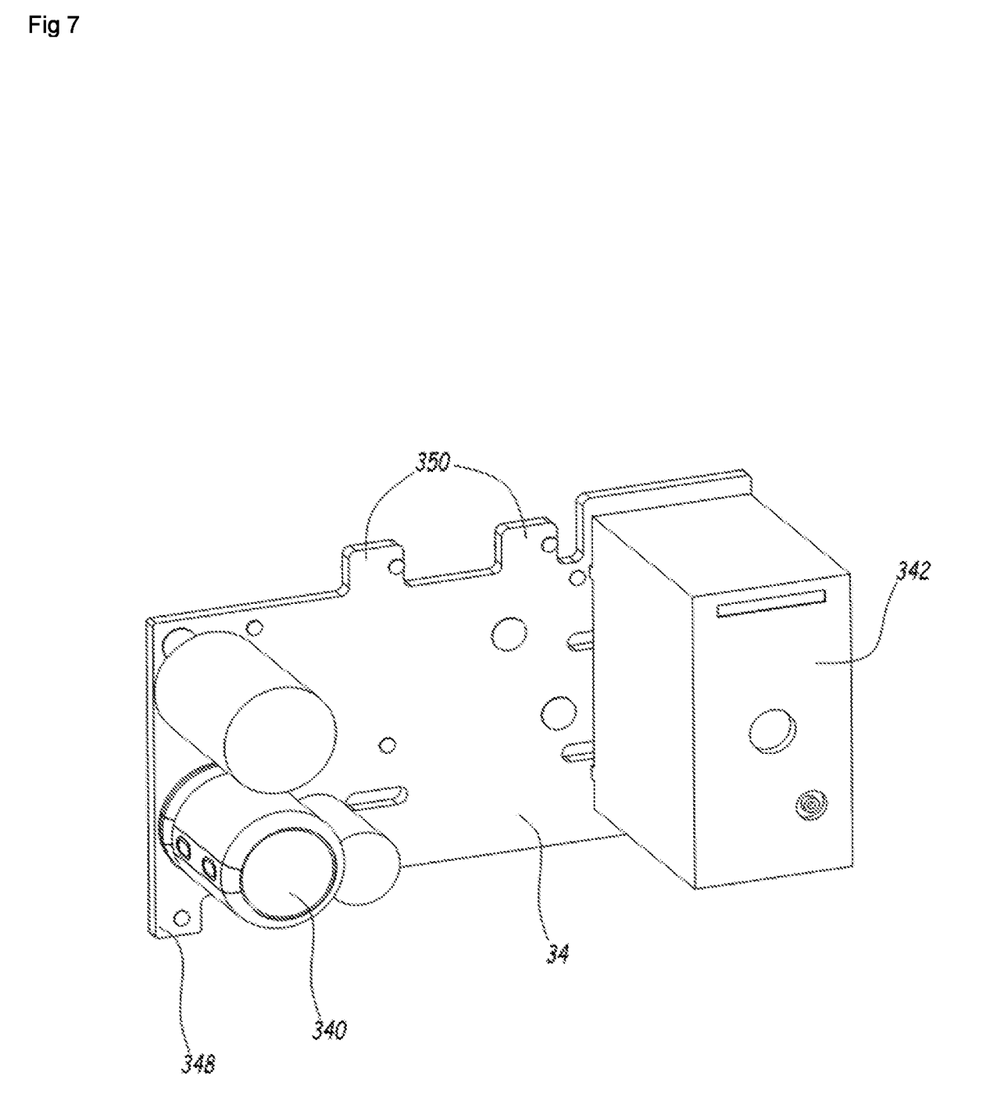
FIG. 7 is a perspective view from below of a power circuit board.
Figure 8:
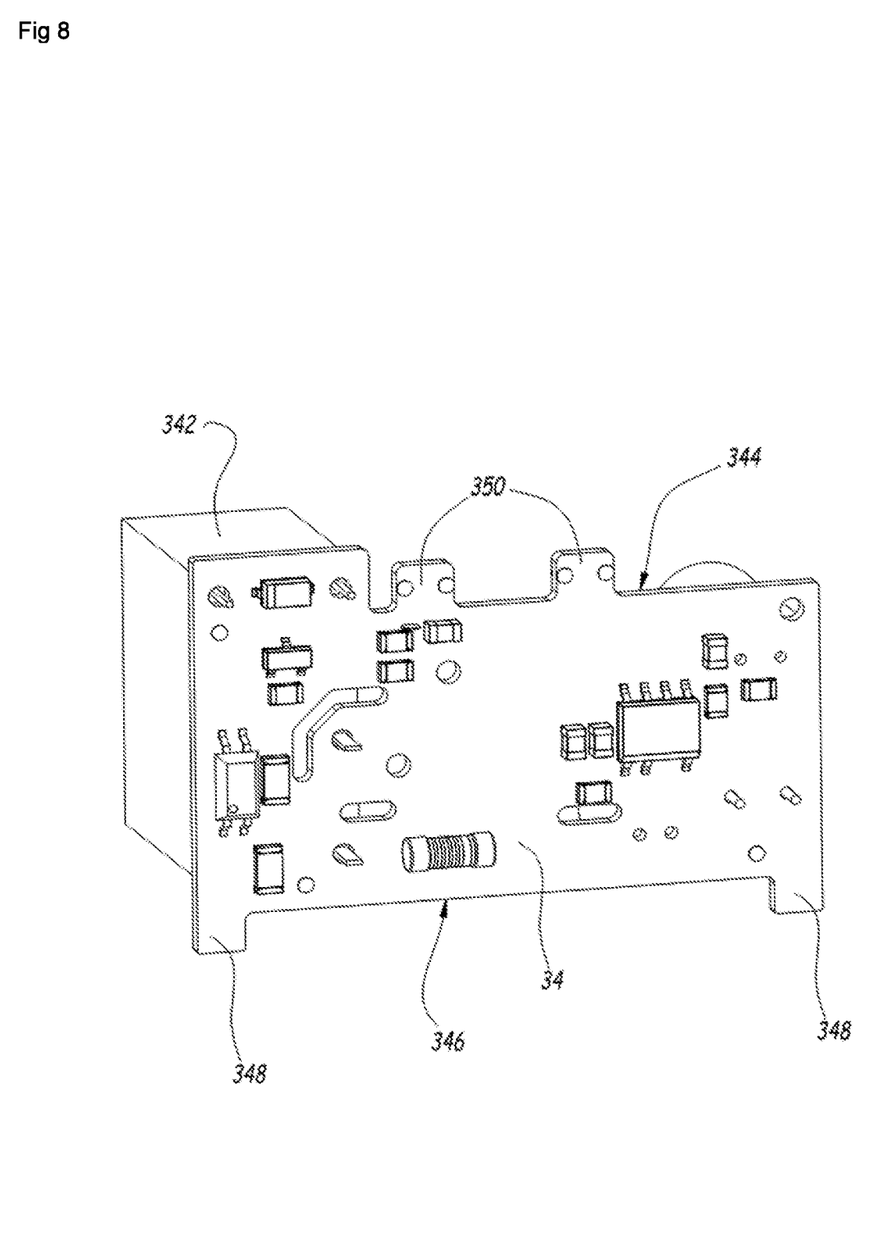
FIG. 8 is a perspective view from above of the power circuit board of FIG. 7.

The members for supplying the electronic device and the luminaire with electrical power are provided on a circuit board 34 which is mounted within the housing 4. These members are configured to provide and to regulate the DC supply on the basis of the AC mains supply received by the device 2. In particular, a filter capacitor 340 and a relay 342 are incorporated on this board 34.

Figure 9:
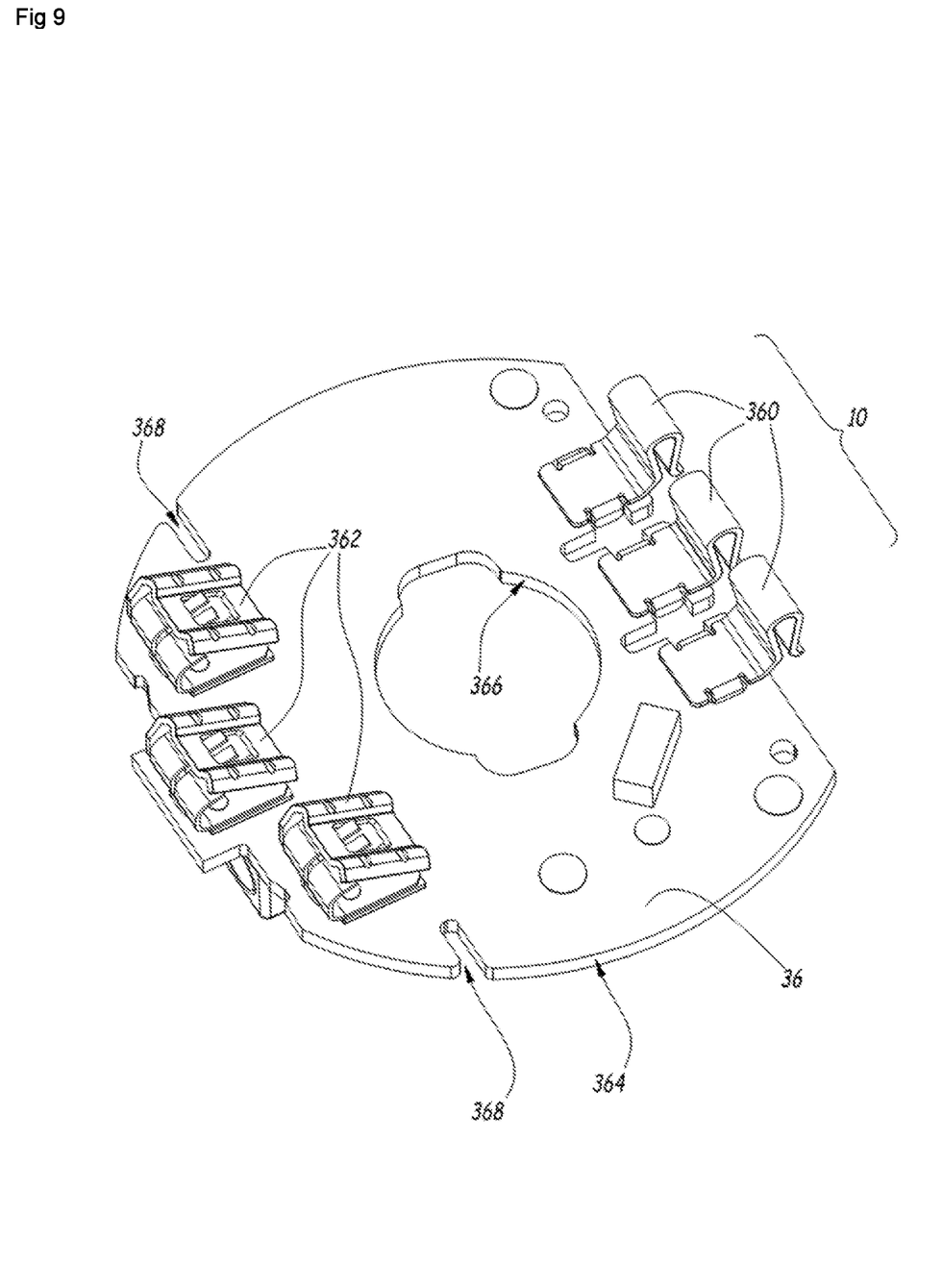
FIG. 9 is a perspective view of a connection circuit board of the connection device.

The members for connection between the connection socket 10 for the luminaire and the connection zone 12 for connection to the electrical network are provided on a circuit board 36 that is mounted within the housing 4. This board 36 includes in particular three connection terminals 360 (phase, neutral and ground terminals) forming the connection socket 10 for the luminaire, and three connection terminals 362 (phase, neutral and ground terminals) forming the connection zone 12 for connection to the electrical network.

Figure 4:
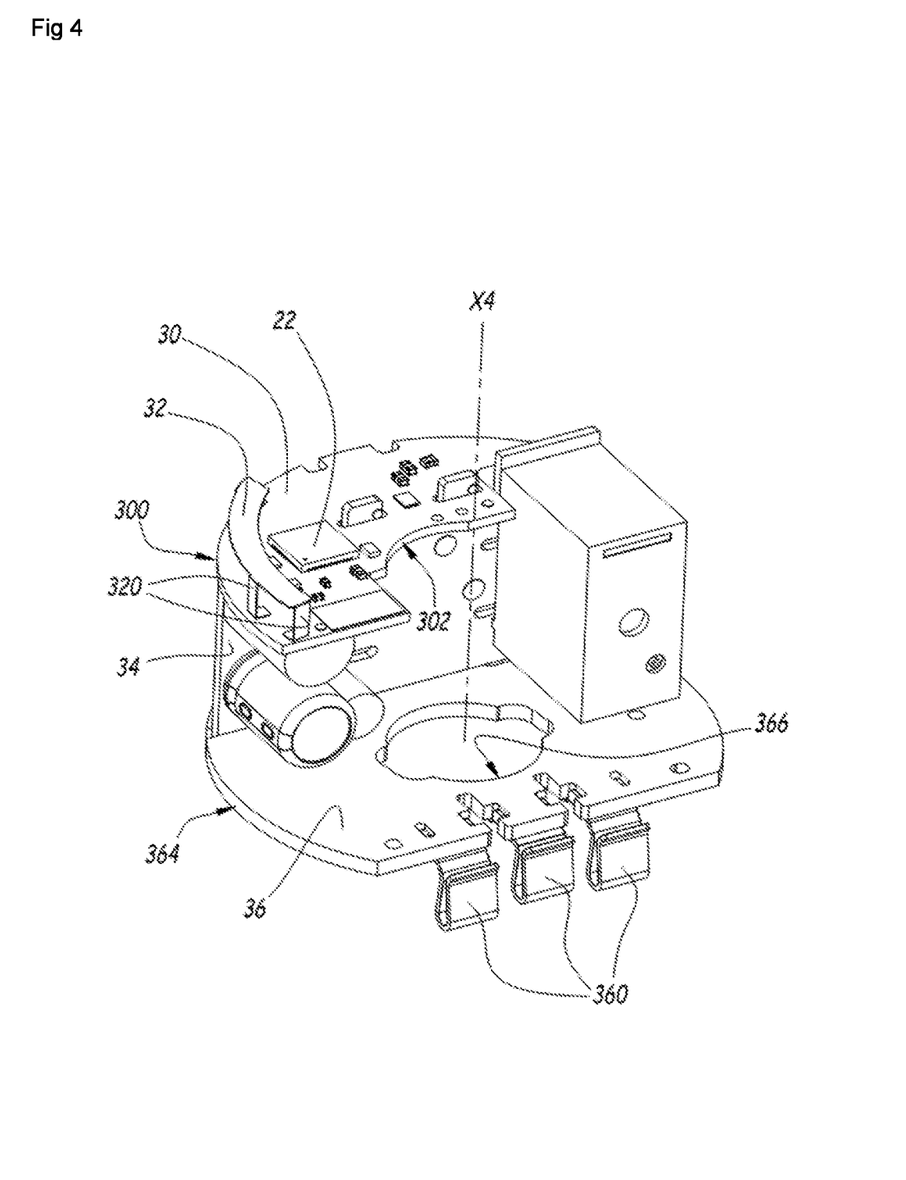
FIG. 4 is a perspective view of the connection device of FIG. 1 with its housing omitted so as to allow the circuit boards to be seen.

The circuit board 34 is oriented parallel to the centre axis X4 and the boards 30 and 36 are oriented perpendicular to the centre axis X4. The board 30 is attached to a first axial edge 344 of the board 34, which edge is located on the front-face 14 side, and the board 36 is attached to a second axial edge 346 of the board 34, which edge is opposite the first axial edge 344 along the centre axis X4, i.e. on the back-face 16 side. Thus, the components for control and communication, in particular the button 26 and the antenna 32, are located close to the front face 14 so as to protrude out of the wall 8, while the connection terminals 362 are on the back face 16 so as to be able to be connected to electrical wires present in the mounting space 6.

The circuit boards 30 and 36 have a respective semicircular outline 300 and 364 centred on the centre axis X4 and delimited by an inner wall 40 of the housing 4, and a respective central aperture 302 and 366 around the central shaft 18 of the housing 4.

The circuit boards 30, 34 and 36 are attached to one another by slot-fitting members and welds ensuring that the boards are electrically connected to one another. In detail, the board 34 includes two lugs for attachment and (phase and neutral) connection 348 to the board 36. These two lugs 348 are slotted into two complementary apertures 368 in the board 36. The lugs 348 are provided with conductive tracks (not shown), which make electrical contact with conductive tracks (not shown) that are provided on the periphery of the apertures 368. Welds (not shown) provide the assembly of the lugs 348 and the apertures 368 with mechanical strength and electrical conduction.

Similarly, the board 34 also includes two lugs for attachment and (phase and neutral) connection 350, which are slotted into two complementary apertures 304 in the board 30. Conductive tracks and welds (not shown) provide the assembly of the lugs 350 and the apertures 304 with mechanical strength and electrical conduction.

The three boards 30, 34 and 36 attached and connected in this way form a rigidly connected assembly which is itself fixed inside the housing 4. As can be seen in FIG. 5, the housing 4 may comprise two parts 4A and 4B assembled together. The part 4A is cylindrical in shape and bears the front face 14. The assembly formed by the three boards 30, 34 and 36 is inserted into the part 4A. The part 4B bears the back face 16 and closes off the interior volume V of the housing 4, and encloses the boards 30, 34 and 36 within the housing 4.

The invention claimed is:

1. A connection device for a luminaire, comprising:
   a housing that is intended for installation in a mounting space in a wall of a premises, said device comprising a connection socket for a luminaire and a connection zone for connection to an electrical network, wherein the housing forms an interior volume inside which members for supplying the luminaire with electrical power, members for connection between the connection socket for the luminaire and the connection zone for connection to the electrical network and a system for control and communication with a unit external to the connection device are incorporated, wherein the system for control and communication comprises a radiofrequency communication antenna, wherein the device includes a front face that is rigidly connected to the housing and configured to protrude out of the mounting space, and wherein the antenna is installed in a zone of the device that is located in a volume delimited by the front face and protrudes out of the mounting space.

2. The connection device according to claim 1, wherein the front face has a wall provided with a decrease in thickness forming a cavity oriented towards an inner side of the housing and in which the communication antenna is accommodated.

3. The connection device according to claim 1, wherein the members for supplying the luminaire with electrical power are provided on a first circuit board that is mounted within the housing, in that the members for connection between the connection socket for the luminaire and the connection zone for connection to the electrical network are provided on a second circuit board that is mounted within the housing, and wherein the system for control and communication is provided on a third circuit board that is mounted within the housing.

4. The connection device according to claim 3, wherein the first circuit board is oriented parallel to a centre axis of the housing, and wherein the second and third boards are oriented perpendicular to the centre axis, the second board being attached to a first axial edge of the first board, and the third board being attached to a second axial edge of the first board opposite the first axial edge along the centre axis.

5. The connection device according to claim 4, wherein the circuit boards are attached with slot-fitting members and welds ensuring that the boards are electrically connected to one another.

6. The connection device according to claim 4, wherein the second and third circuit boards have a semicircular outline centred on the centre axis and delimited by an inner wall of the housing, and a central aperture around a central shaft of the housing.

* * * * *